United States Patent
Wang et al.

(10) Patent No.: US 11,768,538 B1
(45) Date of Patent: Sep. 26, 2023

(54) WEARABLE ELECTRONIC DEVICE WITH PHYSICAL INTERFACE

(71) Applicants: Paul X. Wang, Cupertino, CA (US); Yoonhoo Jo, San Francisco, CA (US); Dinesh C. Mathew, San Francisco, CA (US)

(72) Inventors: Paul X. Wang, Cupertino, CA (US); Yoonhoo Jo, San Francisco, CA (US); Dinesh C. Mathew, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 217 days.

(21) Appl. No.: 16/856,079

(22) Filed: Apr. 23, 2020

Related U.S. Application Data

(60) Provisional application No. 62/838,982, filed on Apr. 26, 2019.

(51) Int. Cl.
*G06F 3/01* (2006.01)
*G06F 3/041* (2006.01)

(52) U.S. Cl.
CPC ............ *G06F 3/014* (2013.01); *G06F 3/0414* (2013.01)

(58) Field of Classification Search
CPC .............................. G06F 3/014; G06F 3/0414
See application file for complete search history.

(56) References Cited

U.S. PATENT DOCUMENTS

| | | | |
|---|---|---|---|
| 5,954,119 A | 9/1999 | Yamamura et al. | |
| 8,605,008 B1 | 12/2013 | Prest et al. | |
| 9,176,325 B2 | 11/2015 | Lyons | |
| 9,429,759 B2 | 8/2016 | Hoellwarth | |
| 9,713,756 B1 | 7/2017 | Tran et al. | |
| 10,045,449 B1* | 8/2018 | Yee | A61F 9/02 |
| 11,114,952 B1* | 9/2021 | Wallin | H01L 41/0973 |
| 11,163,166 B1* | 11/2021 | Ebert | G02B 27/0093 |
| 2013/0022220 A1 | 1/2013 | Dong et al. | |
| 2014/0317503 A1* | 10/2014 | Lucero | G06F 3/0488 715/708 |
| 2015/0092107 A1* | 4/2015 | Shao | H04N 21/47 348/561 |
| 2016/0317352 A1 | 11/2016 | Blumer et al. | |

(Continued)

FOREIGN PATENT DOCUMENTS

| | | |
|---|---|---|
| CN | 104136957 B | 1/2018 |
| DE | 60118499 T2 | 9/2006 |

(Continued)

OTHER PUBLICATIONS

OpenMR, "Idea for Custom Fitted Foam Pad for HMD", Feb. 2019, https://community.openmr.ai/t/idea-for-custom-fitted-foam-pad-for-hmd/14536 (5 pp).

(Continued)

*Primary Examiner* — Stacy Khoo
(74) *Attorney, Agent, or Firm* — Young Basile Hanlon & MacFarlane, P.C.

(57) ABSTRACT

A head-mounted display unit includes a display and a facial support. The facial supported is coupled to the display for engaging a face of a user to support the display thereon. The facial support is selectively changeable from a compliant state to a support state in which the facial support is more resistant to shape deformation than in the compliant state.

24 Claims, 12 Drawing Sheets

(56) References Cited

U.S. PATENT DOCUMENTS

2018/0299681 A1* 10/2018 Eastwood .............. G02C 11/10
2018/0364491 A1* 12/2018 Park ................... G02B 27/0176

FOREIGN PATENT DOCUMENTS

EP           1659891 A1    5/2006
WO        2018197416 A1   11/2018

OTHER PUBLICATIONS

Coxworth, Ben, "New 'Super-Gel' is Liquid When Cold and Stiffens When Heated", New Atlas, Jan. 23, 2013, https://newatlas.com/super-gel-temperature-responses/25934/ (6 pp).

Stauffer, Nancy W., "Saving Heat Until You Need It", MIT News, On Campus and Around the World, Dec. 19, 2018, http://news.mit.edu/2018/thermal-energy-storage-material-saves-heat-1219 (5 pp).

Erhun, M., et al., "Heat Transfer Effects During Solidification of Semicrystalline Polymers", Journal of Engineering Materials and Technology, Jan. 1, 1993 https://asmedigitalcollection.asme.org/materialstechnology/article-abstract/115/1/30/402893/Heat-Transfer-Effects-During-Solidification-of?redirectedFrom=fulltext (7 pp).

Dumé, B., "Law-Breaking Liquid Defies the Rules", Soft Matter and Liquids, Research Update, Sep. 24, 2004, https://physicsworld.com/a/law-breaking-liquid-defies-the-rules/ (2 pp).

Xu, Wen-Cong, et al., "Photoinduced Reversible Solid-to-Liquid Transitions for Photoswitchable Materials", Angewandte Chemie International Edition / vol. 58, Issue 29, Feb. 8, 2019, https://onlinelibrary.wiley.com/doi/abs/10.1002/anie.201814441?af=R (2 pp).

Klouda, L., et al., "Thermoresponsive Hydrogels in Biomedical Applications—A Review", Eur J. Pharm Biopharm Jan. 2008, https://www.ncbi.nlm.nih.gov/pmc/articles/PMC3163097/ (24 pp).

Revols, "Custom-Fit Wireless Earphones", Perfect Fit. Ultimate Comfort. Premium Sound. http://web.archive.org/web/20181213015954/https:/www.revols.com/, Dec. 13, 2018, last accessed Apr. 22, 2020 (8 pp).

\* cited by examiner

US 11,768,538 B1

WEARABLE ELECTRONIC DEVICE WITH PHYSICAL INTERFACE

CROSS-REFERENCE TO RELATED APPLICATION(S)

This application claims priority to and the benefit of U.S. Provisional Application No. 62/838,982, filed Apr. 26, 2019, the entire disclosure of which is incorporated by reference herein.

TECHNICAL FIELD

This disclosure relates to electronic devices and, in particular, wearable electronic devices.

BACKGROUND

Wearable electronic devices may include interfaces for engaging users for both user comfort and functional purposes.

SUMMARY

Disclosed herein are implementations of wearable electronic devices.

In one implementation, a head-mounted display unit includes a display and a conformable support. The conformable support is coupled to the display for engaging a face of a user to support the display thereon. The conformable support is selectively changeable from a compliant state to a support state in which the conformable support is more resistant to shape deformation than in the compliant state.

The head-mounted display may include two or more of the conformable supports and a facial seal with each of the conformable supports being a facial support configured to conform to engage a different facial datum for supporting the display thereon, and the facial seal being configured to engage the face of the user with less pressure than the facial supports and blocks environmental light from eyes of the user. The facial support may include a support material and a material actuator that is selectively operable to change a material property of the support material to change the facial support to the support state. In the compliant state, the facial support may be conformable by the face of the user into a conformed shape, and in the support state, the facial support may be maintained in the conformed shape.

In one implementation, a facial interface includes a chassis and a facial support. The chassis includes a front side and a back side, the back side being configured to couple to a head-mounted display unit. The facial support is coupled to the front side of the chassis for engaging a face of a user to support the head-mounted display unit thereon. The facial support includes a support material having a deformation property is selectively changeable by a material actuator from a compliant state to a support state.

In one implementation, a finger-worn user input device includes a sensor and a finger interface. The finger interface is coupled to the sensor and configured to engage a finger of a user for supporting the sensor thereon. The finger interface includes a support material having a material property that is selectively changeable from a compliant state in which the support material conforms to a shape of a finger of the user and a support state in which the support material is more resistant to shape deformation than in the compliant state.

DETAILED DESCRIPTION

Disclosed herein are wearable electronic devices and physical interfaces that help provide user comfort and support various functionality of the electronic device. In one example, the wearable device is a display system that is worn on a head of a user, which may be referred to as a head-mounted display unit. The head-mounted display unit includes a physical interface that engages the face of the user to both support the head-mounted display unit thereon in a suitable position and to also prevent environmental light from reaching eyes of the user. The physical interface is referred to herein as a facial interface and may also be referred to as a facial support or light seal. The physical interface includes one or more facial supports that are selectively changeable between compliant and support states. In the compliant state, the facial support conforms to the shape of the face of the user. In the support state, the facial support is maintained in the conformed shape, for example, by resisting shape deformation more than in the compliant state. For example, the facial support may include a structural material having a material property (e.g., a deformation property, such as hardness, stiffness, and/or viscosity) that is selectively changeable from the compliant state to the support state. The change may be permanent, reversible, and/or dynamic. During subsequent use in the support state, the conformed shape of the facial interface accounts for the unique size and/or shape of the face of the user, while providing comfort when wearing the head-mounted display unit, suitable positioning of the head-mounted display unit relative to eyes of the user, and reliable light sealing.

In another example, the wearable device is a user input device that is worn on a finger of a user. The user input device may be referred to as a finger-worn control device. The finger-worn control device includes a physical interface that engages the finger of the user to both support the finger-worn control device thereon and provide reliable sensing of the finger (e.g., movement, force, changes of shape). The finger interface may be configured similar to the facial interface by having a finger support that is selectively changeable between compliant and support states. During subsequent use in the support state, the finger interface accounts for the unique size and/or shape of the finger of the user, while providing comfort when wearing the finger-worn control device and/or providing reliable sensing.

Figure 1:
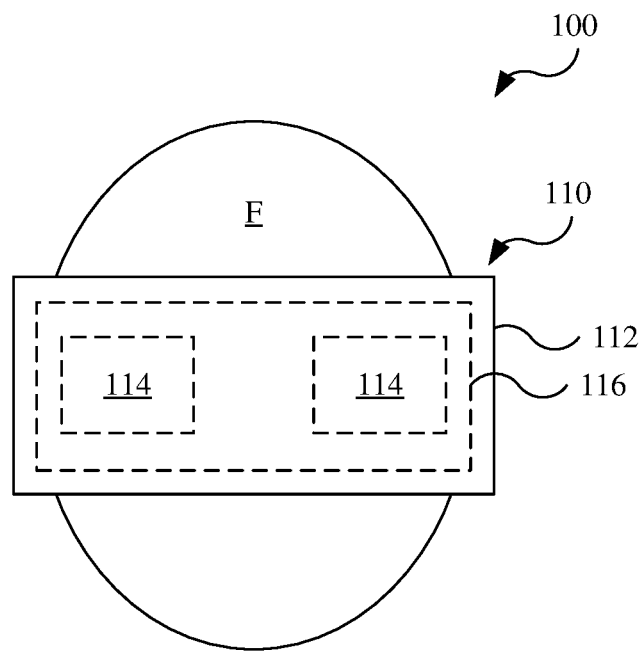
FIG. 1 is a front view of a display system having head-mounted display unit on a user.
Figure 2:
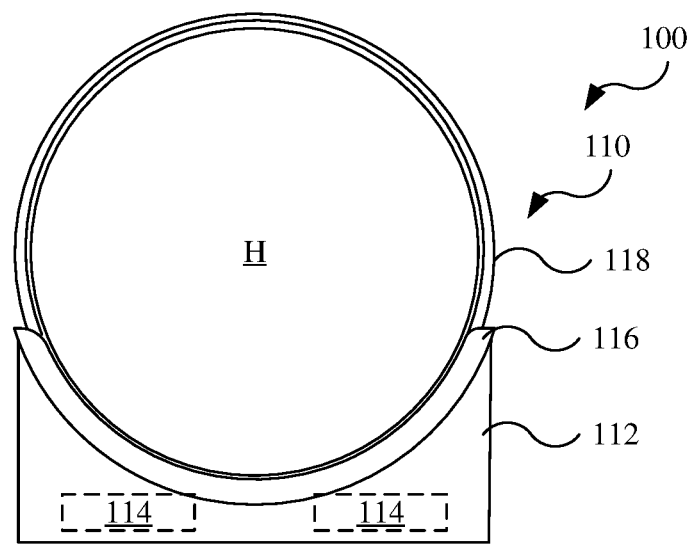
FIG. 2 is a top view of the head-mounted display unit of FIG. 1 on the user.

Referring to FIGS. 1 and 2, a display system 100 includes a head-mounted display unit 110 and various electronics. The head-mounted display unit 110 includes a chassis 112 (e.g., a housing) and one or more displays 114, a facial interface 116, and a head support 118 that are couple to the chassis 112. The facial interface 116 engages the face F of the user, while the head support 118 engages the head H of the user, so as to support the chassis 112 thereon with the displays 114 in position for displaying graphical content (e.g., computer-generated reality, discussed below) to the user. The facial interface 116 may be considered to be an adaptable-fit or custom-fit facial interface, which becomes shaped uniquely to a given user and retains such shape. The facial interface 116 may also be removably coupled (e.g., interchangeably coupled) to the head-mounted display unit 110, for example, such that multiple different people (e.g., of a family) may have different facial interfaces that are usable with the head-mounted display unit 110.

The head support 118 may be adjustable in length and/or force, so as to accommodate different sizes of heads H and/or usage scenarios (e.g., generally static vs. high magnitude and/or frequency of movement). The head support 118 may, for example, include elastic members or mechanisms, mechanic members (e.g., having geared knobs), and/or coupling/decoupling (e.g., hook and loop fasteners, protrusions and corresponding recesses, and/or latches) by which the head support 118 is adjustable. While shown illustrated as extending around sides of the head H, the head support 118 may also extend over a top of the head H. The head support 118 may also be detachable from the chassis 112.

Figure 3:
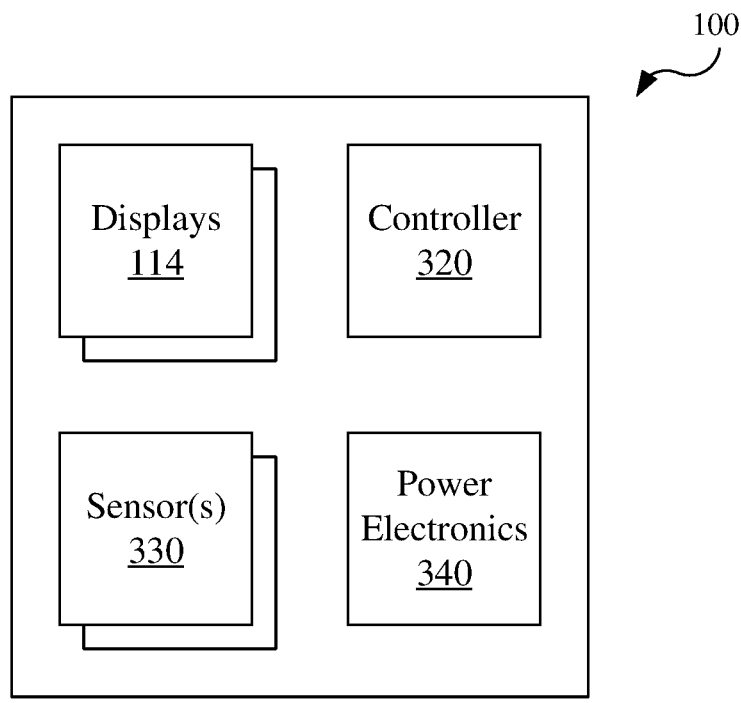
FIG. 3 is a schematic view of the display system of FIG. 1.

Referring to the schematic view of FIG. 3, The various different electronics may be coupled to the head-mounted display unit 110 (e.g., to the chassis 112) and movable therewith, or may be positioned remotely therefrom (e.g., in wired or wireless communication). The electronics include, for example, the displays 114, a controller 320, sensors 330, and/or power electronics 340. The controller 320 is a computing device that controls various operations of the display system 100, such as output of graphical content with the displays 114 according to the sensors 330. An example hardware configuration of the controller 320 is discussed below with respect to FIG. 4.

The sensors 330 detect various user conditions and/or various environmental conditions. The sensors 330 may, for example, include user sensors, such as a movement sensor for sensing movement of the head H of the user (e.g., accelerometer, gyroscope, inertial measurement unit (IMU), global positioning sensors), eye movement (e.g., with cameras or other sensors directed to the eyes), light exposure within the facial interface 116 (e.g., with cameras and/or light sensors), and/or physiological and/or biometric conditions (e.g., with cameras or other sensors directed to the eyes or other features of the user). The sensors 330 may, instead or additionally, include environmental sensors, such as outwardly-facing cameras (e.g., for observing the environment from the head-mounted display unit 110) and/or microphones (e.g., for detecting sounds from the user and/or the environment). The sensors 330 may also include communications devices, such as radios for communication with other devices (e.g., a user input device, the controller 320, and/or electronic devices associated with other persons). The sensors 330 may be configured to identify a user of the head-mounted display unit 110 (e.g., using eye cameras to detect characteristics of the user's eye or other biometric features, such as facial shape, voice, fingerprint).

The power electronics 340 provide electric power for operating the display system 100 and may, for example, include a battery coupled to or remotely provided from the head-mounted display unit 110.

Figure 4:
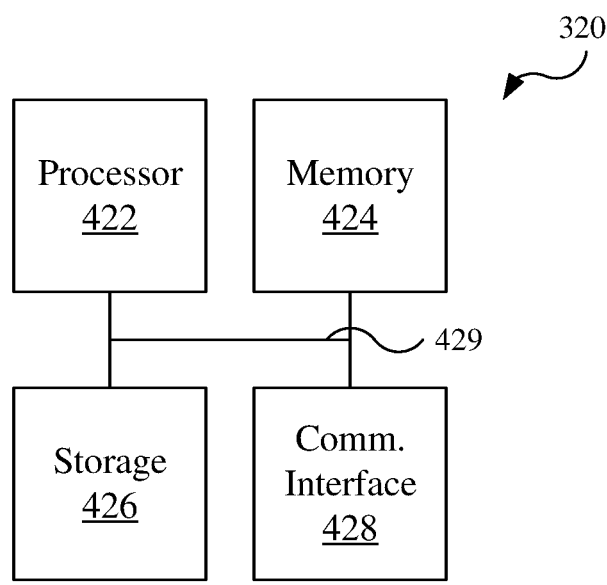
FIG. 4 is a schematic view of a controller of the display system of FIG. 1.

Referring to FIG. 4, an example hardware configuration for the controller 320 is depicted. The controller 320 is a computing device capable of implementing the devices and methods describe herein. The controller 320 generally includes a processor 422, a memory 424, a storage 426, a communications interface 428, and a bus 429 by which the other components of the controller 320 are in communication. The processor 422 is a processing unit, such as a central processing unit (CPU) capable of executing instructions. The memory is a high-speed, volatile memory, such as a random-access memory module (e.g., RAM). The storage is a long-term, non-volatile storage device, such as a hard disk or solid-state drive, that stores programming having instructions to be executed by the processor 422. The communications interface 428 is configured to send signals from the controller 320 (e.g., for operating the displays 114) and receive signals (e.g., signals from the sensors 330).

Figure 5A:
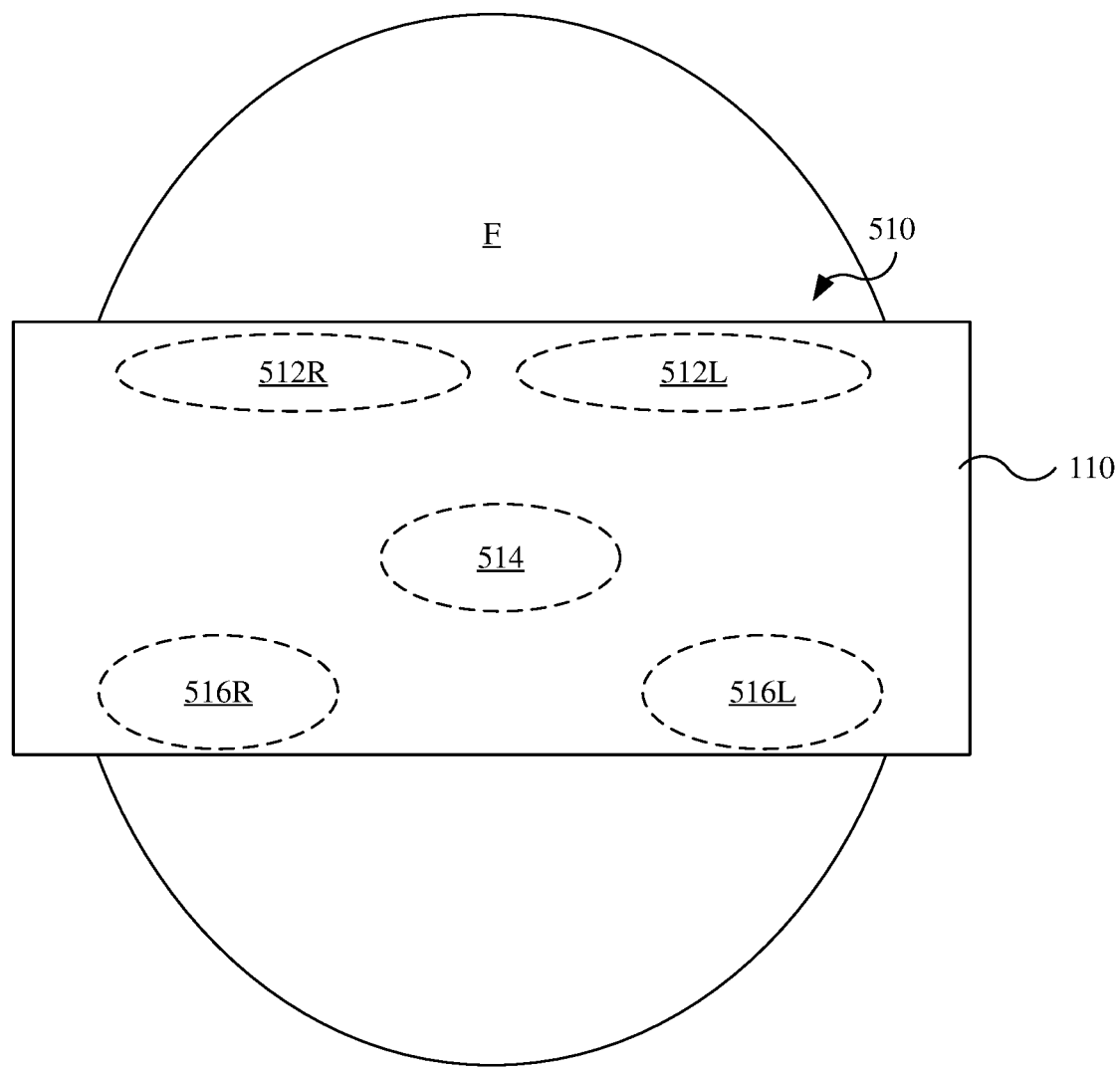
FIG. 5A is a front view of the head-mounted display unit of FIG. 1 on the user schematically indicating facial datums.

Referring to FIG. 5A, the head-mounted display unit 110 is depicted on the head H of the user from an external perspective (e.g., looking at the user). The facial interface 116 engages the face F of the user, which is considered part of the head H of the user. For example, the facial interface 116 may engage one or more facial datums 510, which are facial features on which the head-mounted display unit 110 is primarily supported. The facial datums 510 generally include a left brow 512L, a right brow 512R, a nose bridge 514, a left cheek 516L, and a right cheek 516R of the user. The facial interface 116 may further engage the face F of the user in regions between the facial datums 510, or around the facial datums 510, to prevent environmental light from being visible by the user (e.g., from entering an eye cavity defined by the head-mounted display unit 110 between the face F of the user and surrounded by the facial interface 116). The left brow 512L and the right brow 512R are each labeled accordingly in the figures but may each also be referred to as a brow 512 without reference to location. The left cheek 516L and the right cheek 516R are each labeled accordingly in the figures but may each also be referred to as a cheek 516 without reference to location.

Figure 5B:
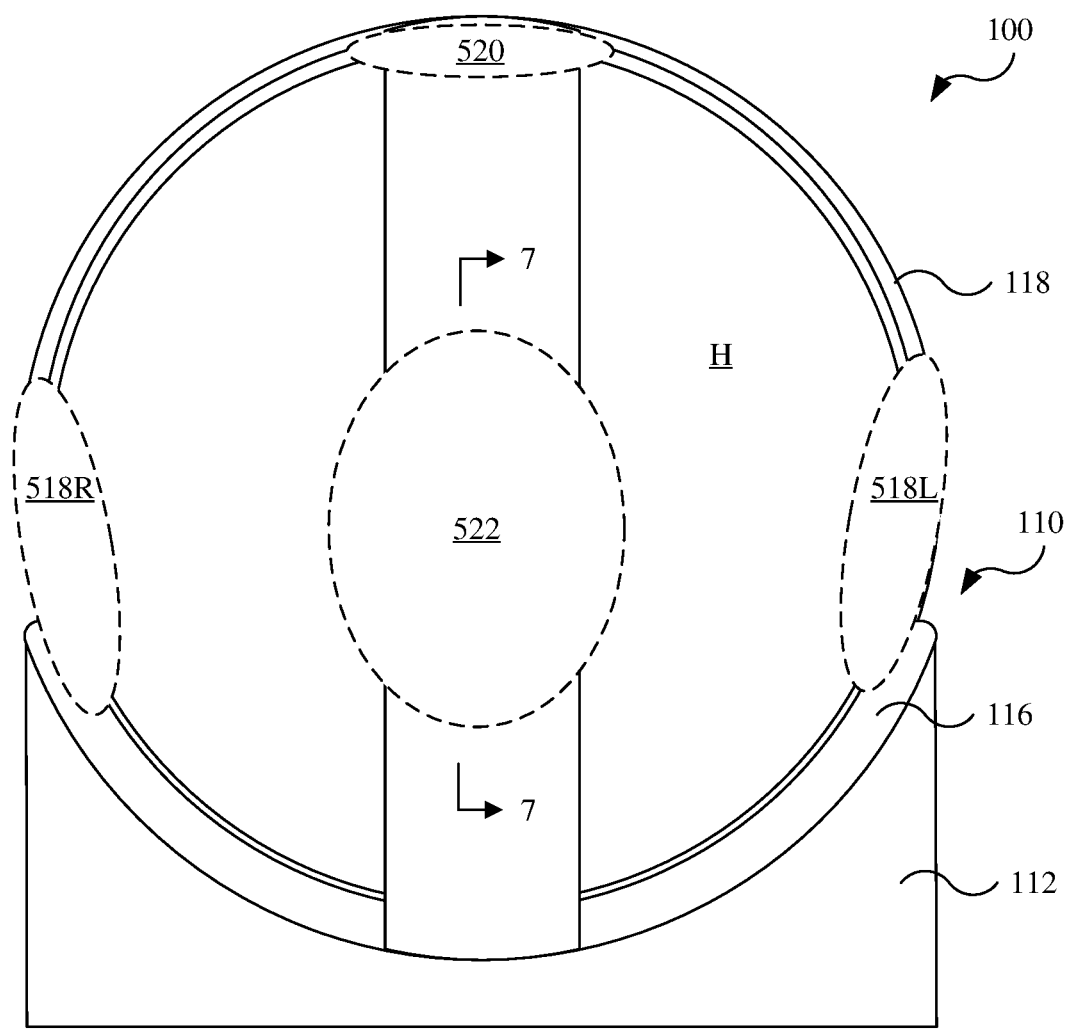
FIG. 5B is a top view of the head-mounted display unit of FIG. 1 on the user schematically indicating head datums.

Additionally referring to FIG. 5B, the head support 118 may engage the head H at various head locations (e.g., head datums), such as a left region 518L (e.g., temple and/or ear region), a right region 518R, a crown region 522 (e.g., on top of the user's head if the head support 118 includes a portion extending thereof), and a rear region 522 (e.g., at the back of the head H). At each such head location, the head support 118 may include rigid structures (e.g., for adjusting and/or stabilizing the head support 118), correspond to sensitive portions of the head (e.g., temples and/or ears), and/or correspond to protruding portions of the head H (e.g., a crown point). The head-mounted display unit 110 (e.g., the head support 118) may include local head supports (discussed below) for engaging such regions of the head (e.g., to distribute force for user comfort). Furthermore, the head support 118 may be releasably coupled to the chassis 112 of the head-mounted display unit 110 and/or be powered thereby, such that different of the head supports 118 may be attached thereto for different users (e.g., being sized and/or custom fit to the user).

Figure 6A:
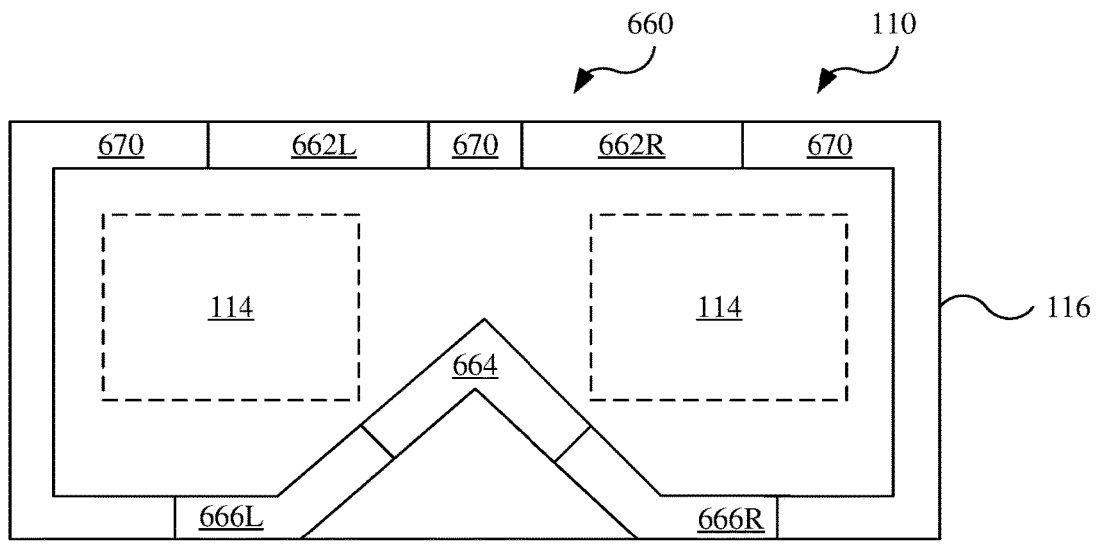
FIG. 6A is a rear view of the head-mounted display unit illustrating a facial interface with a first facial seal.
Figure 6B:
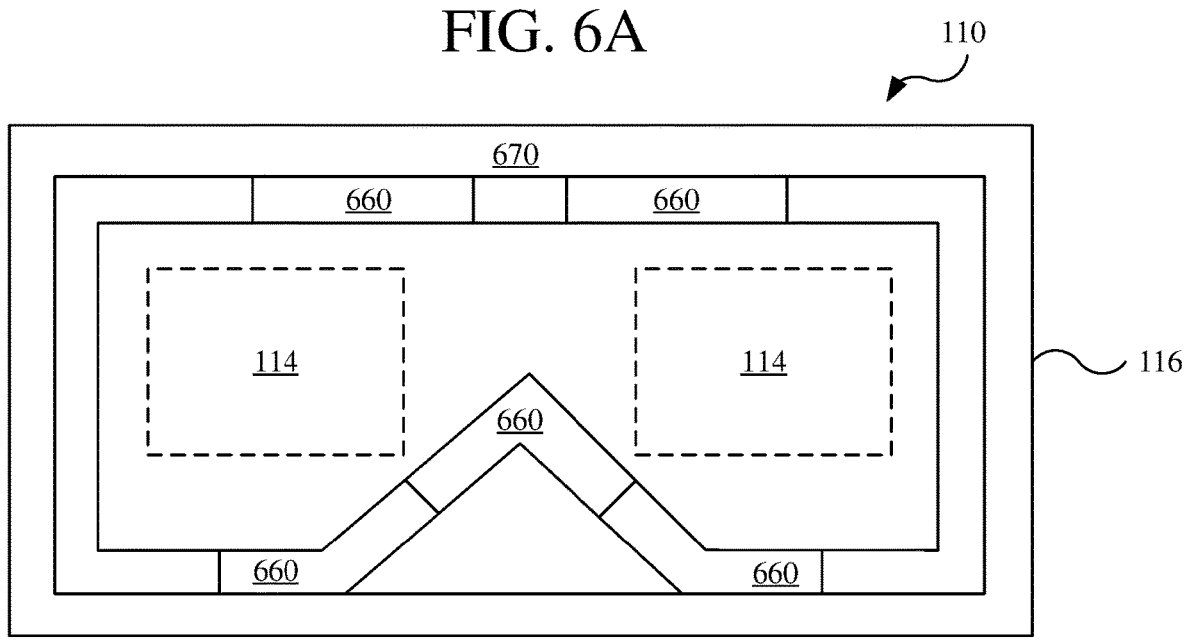
FIG. 6B is a rear view of the head-mounted display unit illustrating the facial interface with a second facial seal.

Referring to FIGS. 6A and 6B, the head-mounted display unit 110 is depicted from an interior perspective (e.g., from a user looking toward the head-mounted display unit 110 when being moved onto the face F). The facial interface 116 configured to engage the facial datums 510, so as to support the head-mounted display unit 110 on the face F of the user in a precise position for user comfort and functional purposes. For example, the displays 114 and/or the sensors 330 may require being precisely positioned relative to users' eyes, for example, to ensure a comfortable viewing experience and/or to accurately detect movement of the users' eyes. Furthermore, the facial interface 116 may preferably engage the face F to continuously engage the face F to prevent environmental light from reaching the users' eyes.

The facial interface 116 includes facial supports 660 and may also include a facial seal 670. The facial supports 660 transfer force to (e.g., engage) the facial datums 510 to support the head-mounted display unit 110 thereon. As discussed below, the facial supports 660 are conformable to the unique shape of the user's face, so as to properly position the displays 114 and/or the sensors 330 relative to the users' eyes. The facial supports 660 may be provided in any suitable number. For example, facial supports 660 may be provided for each facial datum 510, such as a left brow support 662L, a right brow support 662R, a nose facial support 664, a left cheek support 666L, and a right cheek support 666R that correspond to the facial datums 510 of the left brow 512L, the right brow 512R, the nose bridge 514, the left cheek 516L, and the right cheek 516R, respectively, of the user. More or fewer facial supports 660 may be provided, such as one facial support 660 for multiple facial datums 510 (e.g., one upper or brow facial support and one lower or cheek facial support), facial supports 660 for portions of the facial datums 510 (e.g., multiple of the facial supports 660 for each brow or cheek), and/or for fewer than all of the facial datums 510 (e.g., omitting the nose). The facial support 660 may also be referred to as a conformable support or a custom-fit support. The left brow support 662L and the right brow support 662R are each labeled accordingly in the figures but may each also be referred to as a brow support 662 without reference to location. The left cheek support 666L and the right cheek support 666R are each labeled accordingly in the figures but may each also be referred to as a cheek support 666 without reference to location.

Figure 7:
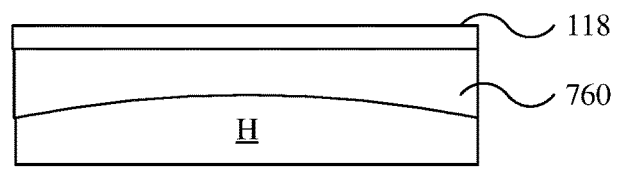
FIG. 7 is a partial cross-sectional view of a head support on the user taken along line 7-7 from FIG. 5B.

Referring additionally to FIG. 7, local head supports 760, which may be configured similar to the facial supports 660 as further described below, may be located in other areas, such as the head datums. The local head supports 760 may allow the head support 118 to be custom-fit to the shape of the head H of the user. In one example, the local head supports 760 are positioned between the head support 118 and the head H of the user (e.g., in the left head region 518L and/or the right head region 518R engaging temple regions and/or ears of the user, in the rear head region 520 engaging the back of the head H, and/or in the crown region 522 engaging the crown of the head H of the user). For example, if the head-support includes rigid elements in those regions (e.g., for the adjustment mechanism), the local head supports 760 may be configured to more evenly distribute force, conform to the shape of the head regions, and/or otherwise provide more comfort to the user.

In still further examples, the head-mounted display unit 110 may be configured as glasses (e.g., without light sealing functionality) in which case the head support 118 includes bows that may rest above, on, and/or wrap behind ears and that include the local head supports 760 for engaging the ears and/or head H proximate the ears of the user. Still further, in the glasses configuration, the facial supports 660 may be configured as nose pads that engage each side of the nose (e.g., two of the nose facial supports 664 illustrated in FIG. 6A). As with the facial support 660, the local head support 760 may also be referred to as a conformable support or a custom-fit support. The local head support 760 may be configured as described below for the different variations of the facial support 660 (e.g., by having a support material 1162 and a material actuator 1164).

The facial seal 670 otherwise engages the face to block environmental light (e.g., seal out light) alone or in combination with the facial supports 660. The facial seal 670 is formed of one or more segments formed of a compliant material, such as a foam, rubber, or other compressible and/or elastic material that conforms to the shape of the user's face and applies less pressure (i.e., force per unit area) to the user's face than the facial supports 660. As shown in FIG. 6, the facial seal 670 (e.g., segments thereof) may be arranged between the facial supports 660, such that the facial seal 670 and the facial supports 660 engage the users' face F and cooperatively surround the user's eyes to block environmental light. Alternatively, as shown in FIG. 7, the facial seal 670 may surround (e.g., positioned radially outward of) the facial supports 660, so as to surround the user's eyes to block environmental light generally independent of the facial supports 660. In still further variations, the facial seal 670 may be arranged between some of the facial supports 660 and surround others.

Figure 8:
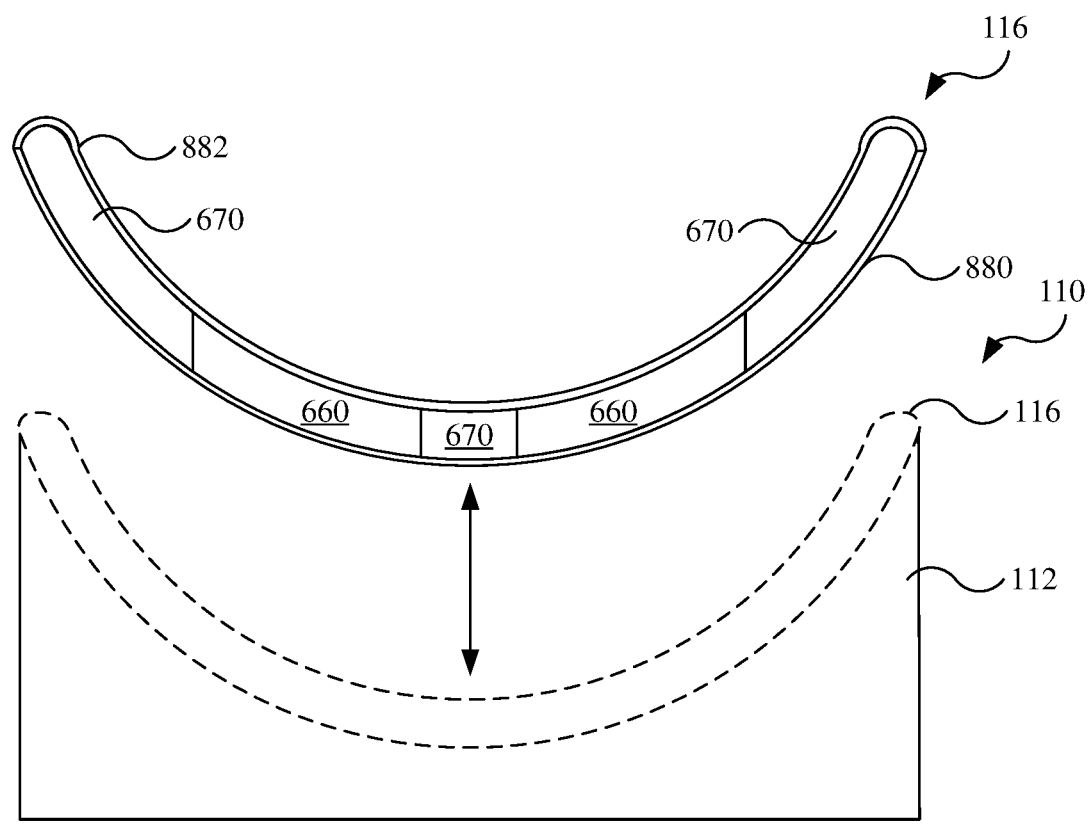
FIG. 8 is a top view of the head-mounted display unit with the facial interface detached and attached (shown in dashed lines).

Referring to FIG. 8, the facial interface 116 may include a chassis 880. The chassis is a generally rigid structure, such as a backing plate formed of a metal or polymer, to which the facial supports 660 and the facial seal 670 are coupled at a front side thereof. A back side of the chassis 880 of the facial interface 116 is in turn mechanically coupleable to the chassis 112 (as shown in dashed lines) of the head-mounted display unit 110 in a suitable manner. For example, the chassis 880 of the facial interface 116 may be irremovably coupled to the chassis 112 of the head-mounted display unit 110 (e.g., using adhesives) or removably (as shown in solid lines; e.g., using magnets, interfitting alignment features (e.g., protrusion and receptacle), mechanical latches, spring clips, or combinations thereof).

The facial interface 116, or the facial supports 660 thereof, may also electrically couple to the chassis 112 of the head-mounted display unit 110 to receive power therefrom for the facial supports 660 (as discussed below) and/or sensors incorporated into the facial interface 116. For example, power may be transferred from the head-mounted display unit 110 (e.g., the power electronics 340 thereof) to the facial interface 116 (e.g., the facial supports 660 thereof) via any suitable conductive connection (e.g., physical connection, such as with sprung or pogo pins and corresponding contacts, or snake bite connections having fixed pins and corresponding receptacles), or inductive connection (e.g., with wireless charging coils).

Alternative to use of the chassis 880, the facial supports 660 and/or the facial seal 670 may be independently coupled to the chassis 112 of the head-mounted display unit 110 for mechanical and/or electrical coupling thereto.

As also shown in FIG. 8, the facial interface 116 may also include a cover 882. The cover 882 cooperatively covers the facial supports 660 and the facial seal 670. The cover 882 may provide the facial interface 116 a uniform appearance, provide a consistent feel on different parts of the face F of the user, and/or allow for cleaning of the facial interface 116 (e.g., to remove oils and other contaminants). The facial interface 116 may be made from any suitable flexible material, such as a woven cloth or polymeric material.

Figure 9:
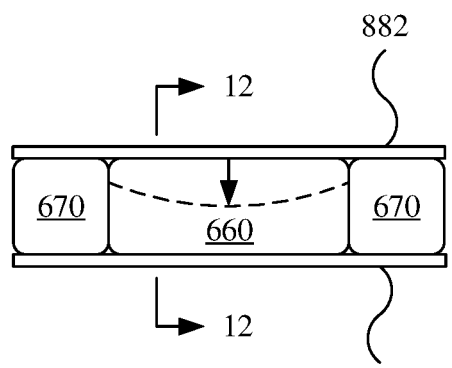
FIG. 9 is a partial view of the facial interface illustrating a facial support with an initial shape and a with a conformed shape (dashed lines).
Figure 10:
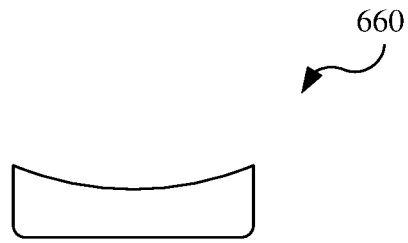
FIG. 10 is view of the facial support of FIG. 9 in the conformed shape.

Referring to FIGS. 9 and 10, each of the facial supports 660 has a deformation property that is selectively changed (e.g., to increase hardness, stiffness, and/or viscosity). In an initial state shown in FIG. 9, the facial support 660 is compliant so as to conform to the shape of the user's face (e.g., the contours of the facial datums 510) and/or to properly position the displays 114 and/or sensors 330 relative to the user's eyes. The initial state may also be referred to as a compliant state or moldable state. In the initial state, the facial support 660 may have an initial shape (e.g., a default shape; as shown in solid lines) and conform to the face F of the user into a conformed shape (illustrated in dashed lines). In a subsequent state shown in FIG. 10, the facial support 660 resists shape deformation, for example, being maintained in the conformed shape. This may provide user comfort (e.g., by distributing loading evenly across the facial datums 510 as opposed to point loading) and/or properly position the displays 114 and/or the sensors 330 relative to the user's eyes. The subsequent state may also be referred to as a support, molded, hardened, or cured state. In different embodiments, the support state may be irreversible, reversible, or dynamic.

As illustrated in FIG. 9, when in the conformed shape, the facial support 660 may be recessed relative to the facial seals 670. As a result, when the facial interface 116 engages the face of the user, the facial seals 670, which may be softer and more compressible than the facial support 660 in the support state, will be compressed more than the facial support 660 adjacent thereto and to engage the face of the user to block environmental light.

Figure 11:
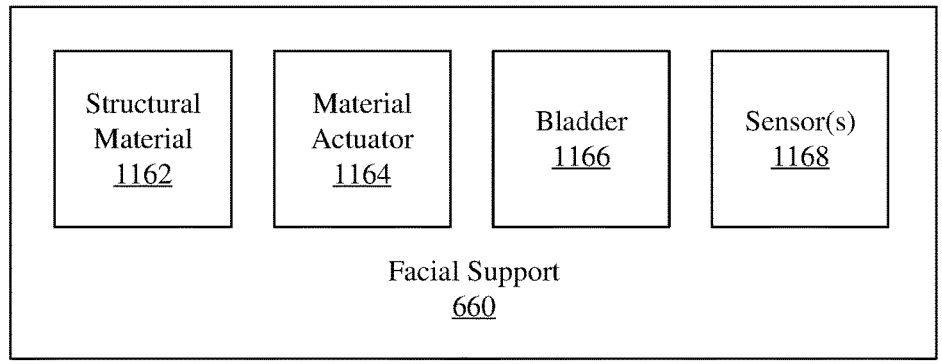
FIG. 11 is a schematic view of the facial support of FIG. 9.

Referring to the schematic view of FIG. 11, each of the facial supports 660 generally includes a support material 1162 having changeable deformation properties (e.g., hardness, stiffness, viscosity) and a material actuator 1164 for selectively changing the deformation property of the support material 1162. The support material 1162 is configured to change between at least two states that include a compliant state and a support state. In the complaint state, the support material 1162 is configured to deform to the shape of facial features engaged thereby, such as the facial datums 510. For example, the support material 1162 may deform under forces applied thereto by the facial features of the user (e.g., the facial datums 510) at magnitudes typically produced when the user wears the head-mounted display unit 110 (e.g., due to tension of the head support 118). The support material 1162 may be provided in the compliant state as a liquid, gel, or solid. The support material 1162 may also be contained (e.g., sealed) within a bladder 1166. The support material 1162 and/or the bladder 1166 may provide the default shape of the facial support 660 in the compliant state. The facial support 660 may also include a sensor 1168 (e.g., facial sensor), such as a pressure sensor, force sensor, capacitance sensor, contact sensor, and/or displacement sensor, which may detect deformation of the facial support 660 and/or contact with the face F of the user. Such pressure, force, capacitance, contact, and/or displacement information (pressure, force, and/or displacement values, globally or locally, and/or maps) may be used to determine proper positioning of the head-mounted display unit 110 on the face F of the user and/or whether environmental light will be blocked(e.g., if no or minimal pressure, may indicate airgap through which environmental light may pass). The sensor 1168As discussed below, such pressure, force, and/or displacement information may also be used to determine content (e.g., graphical content).

In the support state, the support material 1162 resists deformation more than in the compliant state, so as to stably support the head-mounted display unit 110 on the facial datums 510 (i.e., by transferring force therebetween). The support material 1162 resists deformation for example, by having higher hardness, stiffness, and/or viscosity than in the compliant state. The support material 1162 may be changed into the support state permanently (i.e., irreversibly), reversibly, or dynamically. The support material 1162 may also be referred to as a structural material by providing structure to the facial support 660.

The material actuator 1164 causes the support material 1162 to change from the compliant state to the support state, for example, by applying heat, light, or a magnetic field to the structural material, or by causing a chemical reaction. The material actuator 1164 is powered, for example, by the power electronics 340, such that both the facial supports 660 and the displays 114 have a common power source. Specific examples of combinations of support materials 1162 and material actuators 1164 are discussed below.

The bladder 1166, when provided, is formed of a compliant (e.g., flexible and/or elastic) material capable of containing the support material 1162 and conforming to the shape of the face F of the user. For example, the bladder 1166 may be formed of an elastomeric material (e.g., rubber or silicone).

Each of the facial supports 660 has a default shape suitable for engaging the corresponding facial datum 510. The material forming the bladder 1166 and/or the geometry of the bladder 1166 may maintain the facial supports 660 in the default shape of the initial state. The bladder 1166 is deformable for the facial support 660 to conform to the face of the user (e.g., to the facial datums 510) upon application of a force thereto preferably equivalent to or resultant from force applied by the head support 118 to support the head-mounted display unit 110 on the head H of the user. For example, the brow facial supports 662 and/or cheek facial supports 666 may have generally rectilinear shapes, while the nose facial support 664 curves over the bridge of the nose datum 514. When conforming to the shape of the face of the user, a forward face of the bladder 1166 is deflected inward by varying amounts at different locations, which may cause other portions of the bladder 1166 to expand in other directions (e.g., depending on the Poisson's ratio of the support material 1162). The bladder 1166 may directly engage the facial datums 510 or the cover 882 or other material may be arranged therebetween.

Figure 12:
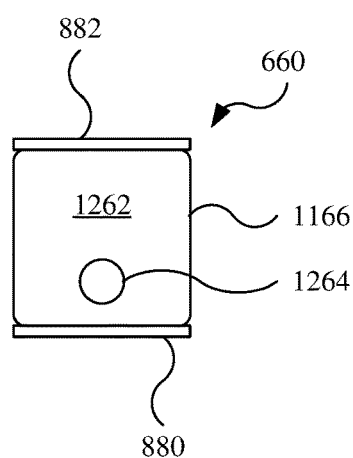
FIG. 12 is a cross-sectional view of a first variation of the facial support of FIG. 9.

Referring to FIG. 12, in one example, the support material 1162 is a photopolymer 1262 that is hardened (e.g., cured) by applying light thereto with the material actuator 1164 that is a light source 1264. The photopolymer may, for example, include one or more of acrylates, methacrylates, urethane acrylates, and urethane methacrylates. The light source 1264 may, for example, be a light-emitting diode (LED) that selectively outputs light of suitable wavelength for hardening the photopolymer 1262. The light source may, for example, be provided within the photopolymer 1262 (e.g., within the bladder 1166) or in another suitable position for providing light to the photopolymer 1262 for curing thereof (e.g., adjacent thereto). The light source 1264 may be powered, for example, by the power electronics 340 of the head-mounted display unit 110 (e.g., being powered by coupling of the facial interface 116 to the chassis 112 thereof). In the compliant state, the photopolymer 1262 may be provided as a liquid, gel, or other compliant form within the bladder 1166. In the support state, the photopolymer 1262 is cured, in whole or in part, to resist shape deformation more than in the compliant state, such as by having a higher stiffness, hardness, and/or viscosity. The photopolymer may be irreversibly cured by the light source.

Figure 13:
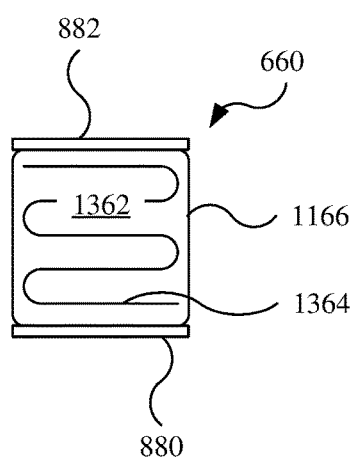
FIG. 13 is a cross-sectional view of a second variation of the facial support of FIG. 9.

Referring to FIG. 13, in another example, the support material 1162 is hardened (e.g., cured) by applying heat thereto with the material actuator 1164. The support material 1162 may, for example, be a thermosetting polymer 1362. The thermosetting polymer 1362 cures at a relatively low temperature but above the human body temperature (e.g., between 110- and 120-degrees Fahrenheit). As a result, the thermosetting polymer 1362 of the support material 1162 will not cure in typical environmental conditions or when in contact with the face of the user and will not cause discomfort to the user. The thermosetting polymer 1362 may be cured irreversibly into the conformed shape, or as discussed below may be a shape-memory polymer that reversibly changes shape.

Figure 14:
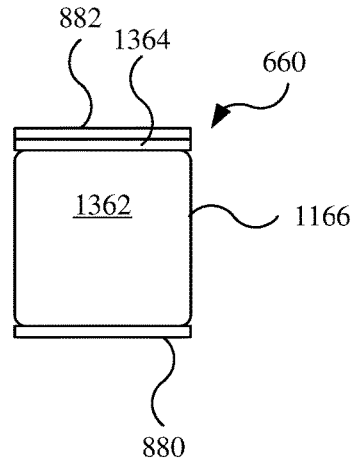
FIG. 14 is a cross-sectional view of a third variation of the facial support of FIG. 9.
Figure 15:
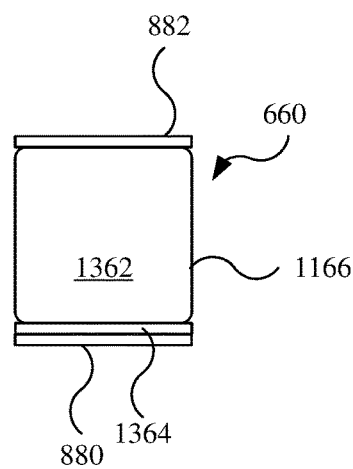
FIG. 15 is a cross-sectional view of a fourth variation of the facial support of FIG. 9.

The material actuator 1164 may be configured in various different manners to output heat to the support material 1162. The material actuator 1164 includes a heating element 1364 (e.g., a resistive heating element, such as a nichrome wire), which receives electrical power from the head-mounted display unit 110 when the facial interface 116 is coupled thereto (e.g., as described above). As shown in FIG. 13, in one example, the heating element 1364 extends through the thermosetting polymer 1362 (e.g., being surrounded thereby) within the bladder 1166 (if provided). The heating element 1364 may be arranged in a serpentine manner (e.g., in a two-dimensional or a three-dimensional serpentine pattern), so as to contact and distribute heat evenly and/or quickly to the support material 1162. As shown in FIG. 14, in another example, the heating element 1364 is positioned outside of but for direct or indirect thermal conduction with the support material 1162. The heating element 1364 may be arranged along one or more surfaces of the support material 1162. For example, the heating element 1364 be arranged along a forward end (e.g., forward surface) of the facial support 660, such as between the cover 882 and the bladder 1166. Alternatively, the heating element 1364 may be arranged along the forward end of the facial support 660 by being integrated into the material of the bladder 1166 or within the bladder 1166 at or near the forward surface formed thereby. As shown in FIG. 15, in another example, the heating element 1364 may be arranged along a rear end (e.g., rear surface) of the support material 1162 (i.e., toward the chassis 112 of the head-mounted display unit 110), such as between the chassis 880 of the facial interface 116 and the bladder 1166. Alternatively, the heating element 1364 may be arranged along a rear end of the facial support 660 by being integrated into the material of the bladder 1166 or within the bladder 1166 at or near the rear surface formed thereby.

Figure 16:
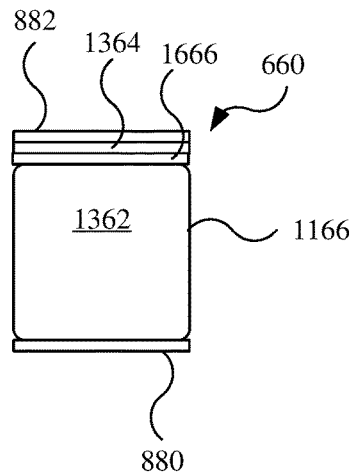
FIG. 16 is a cross-sectional view of a fifth variation of the facial support of FIG. 9.

As also shown in FIG. 16, the facial interface may include a cooling element 1666 (e.g., a conductive plate coupled to a Peltier device), which may overlap the heating element 1364. During use of the head-mounted display unit 110, both the heating element 1364 (i.e., the material actuator 1164) and the cooling element 1666 may be used as part of a computer-generated experience (e.g., simulating heat sources, such as a shining sun or fire, or simulating cooling sources, such as cold water or a cool breeze).

Figure 17:
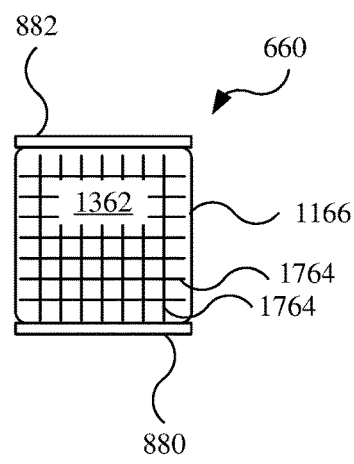
FIG. 17 is a cross-sectional view of a sixth variation of the facial support of FIG. 9.

As shown in FIG. 17, the material actuator 1164 provides locally controllable heating device. For example, the material actuator 1164 may include multiple heating elements 1764 that are selectively operated independent of each other. For example, the heating elements may be provided in different planes (e.g., each extending in a two-dimensional serpentine pattern), linearly within one or more planes, and/or in matrix (e.g., as shown, such that heat may be concentrated at the intersections of two of the heating elements 1764). The heating elements 1764 may be operated independent of each of the other heating elements 1764.

In another example, the support material 1162 is a reversible heat-hardened material that hardens upon application of heat and softens upon cooling (e.g., upon removal of heat). The reversible heat-hardened material may, for example, be or include a shape-memory polymer (e.g., a thermoplastic or thermoset, instead of the thermosetting polymer 1362 that is irreversibly cured). As discussed in further the deformation properties of the reversibly heat-hardened material may be dynamically changed, such as to account for relative movement between the head-mounted display unit 110 and the face F of the user. The material actuator 1164 may be configured as a heating element, as described above (e.g., with respect to the thermosetting polymer).

In another example, the support material 1162 is a magnetorheological fluid, the viscosity of which is changed (e.g., increased and/or decreased) by application and removal, respectively, of a magnetic field. The magnetic field is output by the material actuator 1164, which may be an electromagnet located within the magnetorheological fluid or otherwise configured to provide magnetic field thereto. Due to the quick response time of magnetorheological fluid, the facial support 660 may also be used to provide haptics to the user (e.g., quickly changing viscosity, which may be felt by the user).

In another example, the support material 1162 is a phase change material (e.g., an exothermic phase change material), such as a supersaturated solution of sodium acetate trihydrate. The material actuator 1164 provides a nucleation center that causes the phase change material to crystalize and, thereby, harden. The material actuator 1164 may be a metal material (e.g., a metal disc) that provides the nucleation site when bent. The metal material may be bent with a physical actuator or by being manually manipulated. The hardening of the support material 1162 may be reversed by heating the phase change material.

Figure 18A:
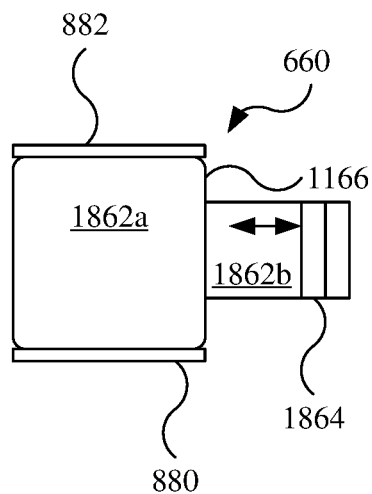
FIG. 18A is a cross-sectional view of a sixth variation of the facial support of FIG. 9 in a first state.
Figure 18B:
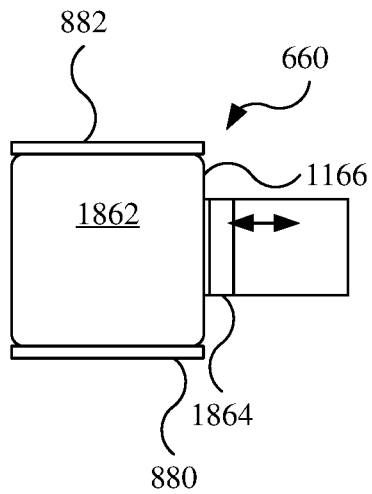
FIG. 18B is a cross-sectional view of the sixth variation of the facial support of FIG. 9 in a second state.
Figure 19A:
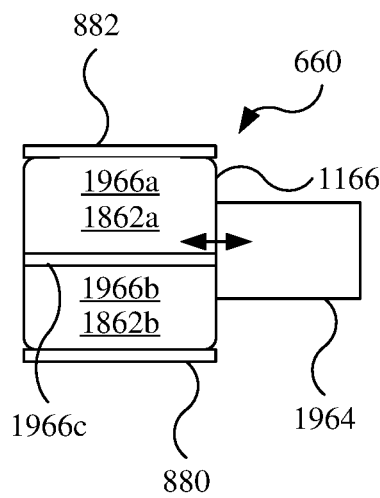
FIG. 19A is a cross-sectional view of a seventh variation of the facial support of FIG. 9 in a first state.
Figure 19B:
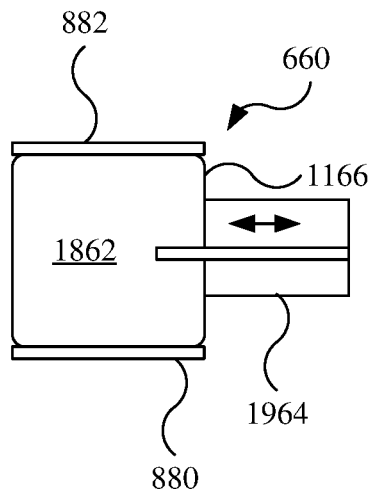
FIG. 19B is a cross-sectional view of the seventh variation of the facial support of FIG. 9 in a second state.

In a still further example, the support material 1162 may change deformation property due to a chemical reaction. For example, referring to FIGS. 18A-18B, the support material 1162 may be an resin 1862 that is selectively hardened upon the mixing of two components 1862a, 1862b (e.g., a resin and a hardener of an epoxy), which may be separately stored and subsequently mixed to conform to the shape of the face F of the user. The resin 1862 may also be referred to as a two-part hardening resin. For example, the material actuator 1164 may be a plunger 1864 that is selectively operated to inject the second component 1862b into the bladder 1166 containing the first chemical 1862a. Alternatively, as shown in FIGS. 19A and 19B, the first component 1862a and the second component 1862b may be stored in separate chambers 1966a, 1966b within the bladder 1166, while the material actuator 1164 is a mixing device 1964 (e.g., a solenoid). The mixing device 1964 (or barrier removal device) is configured to selectively rupture (e.g., pierce) or remove a barrier 1966c between the chambers 1966a, 1966b of the bladder 1166 containing the two components 1862a, 1862b that subsequently mix to form the resin 1862 of the support material 1162. Instead of the two-part hardening resin, the support material 1162 may be any other suitable two-part or multi-part hardening material with one part being a catalyst in liquid or other form to be mixed with another part to cooperatively form the support material 1162.

In yet another example, the support material 1162 is compressible by the material actuator 1164. A resultant increase in pressure may cause the support material 1162 to increase in temperature according to the ideal gas law (e.g., if volume decreases, does not change, or changes proportionally less than the increase in pressure). Further, the increase in pressure may cause the support material 1162 to conform to the shape of the face F of the user. The material actuator 1164 may, for example, be a mechanical, pneumatic, or hydraulic actuator that causes the material 1162 to increase in pressure.

In variations of the support materials 1162 described above, the support material 1162 may have anisotropic deformation properties. For example, the support material 1162 may be more compliant (e.g., less stiff) in a forward direction (e.g., generally perpendicular to the facial surfaces), while being less compliant (e.g., more stiff) in directions perpendicular thereto (e.g., up, down, left, and/or right). In this manner, the support materials 1162 allow the facial supports 660 and the facial interface 116 to be comfortable in static circumstances, while stabilizing the head-mounted display unit 110 laterally in dynamic situations.

Figure 20A:
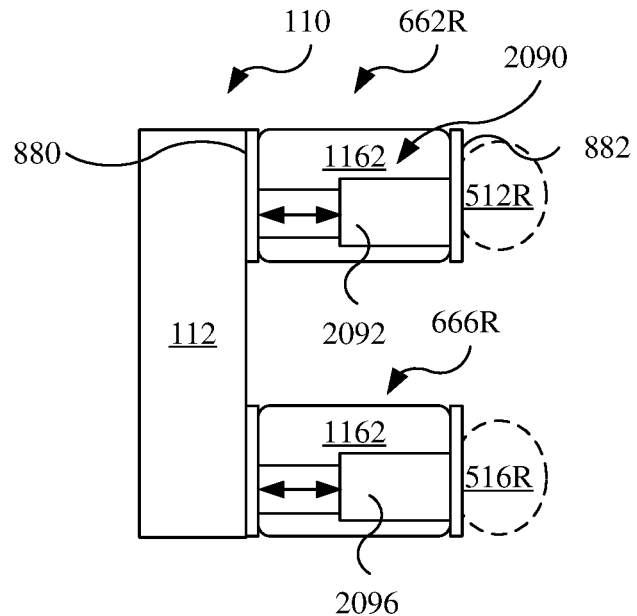
FIG. 20A is a cross-sectional view of the head-mounted display unit of FIG. 1 having a first variation of displacement actuators.
Figure 20B:
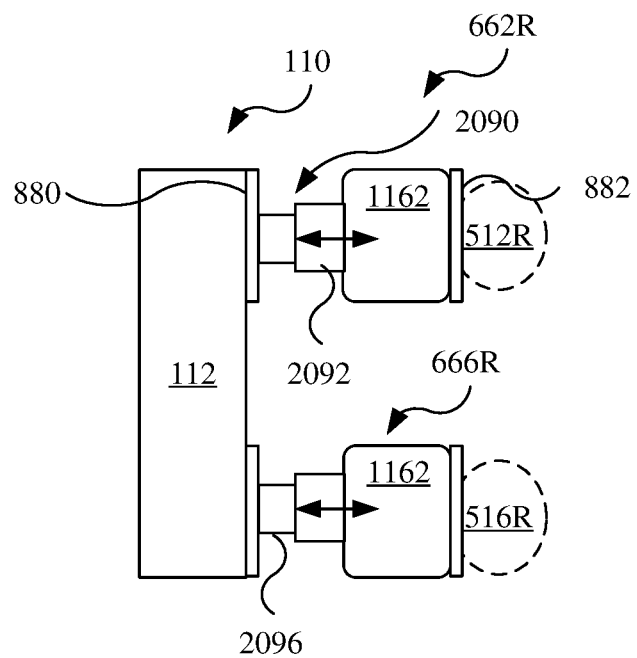
FIG. 20B is a cross-section view of the head-mounted display unit of FIG. 1 having a second variation of displacement actuators.

Referring to FIGS. 20A and 20B, the facial interface 116 may also include one or more displacement actuators 2090. Each displacement actuator 2090 functions to displace the chassis 112 of the head-mounted display unit 110 toward or away from the face F of the user. For example, each of the displacement actuators 2090 may be associated with each of the facial supports 660. The displacement actuators 2090 are operable to move the displays 114 and/or the sensors 330 into proper position and/or orientation relative to the eyes of the user and/or to ensure the facial interface 116 (e.g., the facial supports 660 and the facial seal 670) block environmental light from reaching eyes of the user. The displacement actuator 2090 may, for example, be a linear actuator, such as a lead screw, a telescopic mechanism, or scissor mechanism that is selectively operated (e.g., with an electric motor). For example, during a setup operation, the displacement actuators 2090 may start in an extended position and cooperatively retract to achieve the proper position and/or orientation of the displays 114, the sensors 330, and/or the facial seal 670.

For illustrative purposes and in a non-limiting example, with a person having brows 512 that are relatively protruding and cheeks 516 that are relatively recessed, upper displacement actuators 2092 (e.g., associated with the brows 512) and lower displacement actuators 2096 (e.g., associated with the cheeks 516) may both retract to achieve a desired position between the displays 114 and/or the sensors 330 and the eyes of the user, while the upper displacement actuators 2092 retract less than the lower displacement actuators 2096 to ensure proper orientation (e.g., angle) between the displays 114 and an optical axis of the eyes of the user or another reference (e.g., a horizontal reference plane). The proper position (e.g., a predetermined eye position) may, for example, require placement of the eye pupil within four cubic centimeters of volume or less (e.g., one cubic centimeter or less) positioned relative to the display 114. In another non-limiting example, with a person having brows 512 that are relatively recessed and cheeks 516 that are relatively protruding, both the upper displacement actuators 2092 (e.g., associated with the brows 512) and the lower displacement actuators 2096 (e.g., associated with the cheeks 516) may retract to achieve a desired position between the displays 114 and/or the sensors 330 and the eyes of the user, while the upper displacement actuators 2092 retract more than the lower displacement actuators 2096 to ensure proper orientation (e.g., angle) between the displays 114 and an optical axis of the eyes of the user or another reference (e.g., a horizontal reference plane).

The displacement actuators 2090 may be located in different positions relative to the facial supports 660. In one example shown in FIG. 18, the displacement actuators 2090 are located within the facial supports 660 (e.g., within the support material 1162), and once displacement actuator is appropriately positioned (e.g., retracted), the deformation properties of the support material 1162 is changed, so as to hold the displacement actuators 2090 in proper position (e.g., being cured therearound). Thus, the deformation property of the support material 1162 is changed to both hold the conforming shape with the facial datum 510 and hold the displacement actuators 2090 in position. In another example shown in FIG. 19, each displacement actuator 2090 is coupled to and positioned behind (i.e., away from the face) the facial support 660.

In further variations, the facial interface 116 may be configured to detect and/or identify the user (e.g., the shape of the face F of the user). For example, the sensors 1168 of the facial supports 660, the displacement actuators 2090, or other sensors 330 of the head-mounted display unit 110 are used to identify the user. As referenced above, eye cameras may determine the user by detecting biometric characteristics of the user's eye. The facial supports 660 may detect the shape of the face of the user, for example, by including the sensors 1168 (e.g., pressure sensors) therein or thereon (e.g., on the forward surface of the bladder 1166). The displacement actuators 2090 may also be configured to sense displacement thereof and/or force thereon, so as to provide the positions of various facial features (e.g., the facial datums 510). Various functionality may be afforded by detecting the shape of the face F of the user with the facial supports 660 (e.g., the sensors 1168 thereof) and/or the displacement actuators 2090. For example, various graphical content may be provided (e.g., an avatar resembling the face F of the user).

Still further, based on the identification of the user, the facial interface 116 may be configurable to the identified user. For example, the displacement actuators 2090 may be configured to move to those positions in which the displays 114 are properly positioned or in which blocking of ambient light is suitably achieved by the facial seal 670. In a still further example, such as in the case of the facial support 660 including a shape-memory polymer or another reversible support material 1162, the support material 1162 may be reconfigured for the identified user, such as being reconfigured into the compliant state (i.e., for subsequent conforming to the shape of the face of the user) or being reshaped into the conformed shape.

Still further, for those facial interfaces 116 that are dynamically movable (e.g., in the case of the support material 1162 including a shape-memory polymer and/or the facial interface 116 including the displacement actuators 2090), the facial interface 116 may be operated in different manners, for example, to change the force distribution over time (e.g., increasing force at one facial support and decreasing at another), to disengage the face (e.g., to create airflow channels), and/or as physical content of the user experience of a computer generated reality. For example, as to physical content, as was discussed above with respect to the support material 1162 being magnetorheological fluid, as well as with any other reversible and fast acting support material 1162, the support material 1162 may change state to (e.g., becoming softer and/or harder to provide the use sensations). Instead or additionally, the displacement actuators 2090 may be used to provide physical content, such as by pressing with more sustained force against the face F of the user in a quick, sustained, or pulsating manner. By operating the support material 1162 and/or the displacement actuators 2090 in these manners, physical content may be output thereby to represent, for example, an object pressing against the face F, an impact of an object with the face F of the user, and/or other sensations (e.g., bubbles on popping on the face F).

Figure 21:
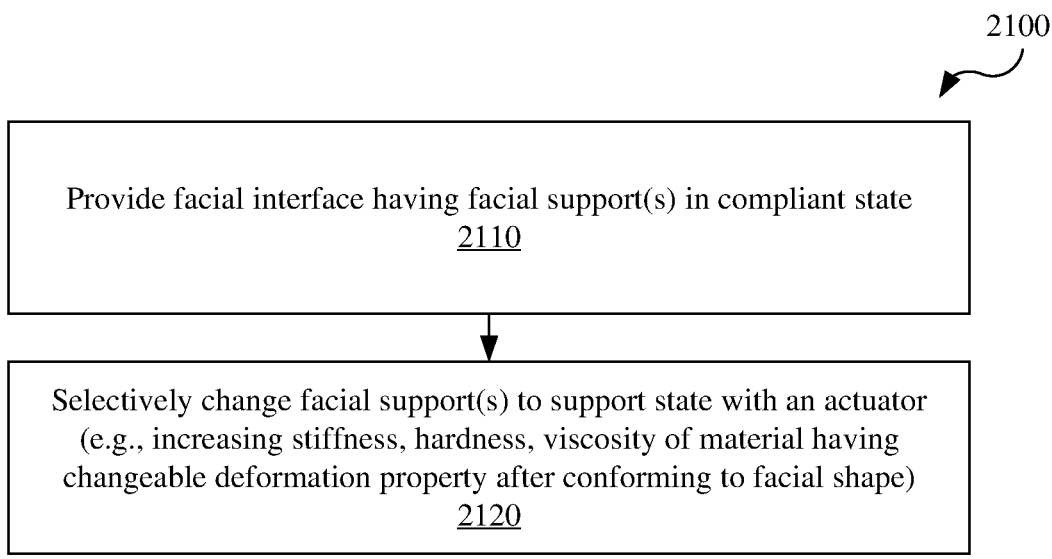
FIG. 21 is a flow diagram of a first process for fitting a facial interface to a user.
Figure 22:
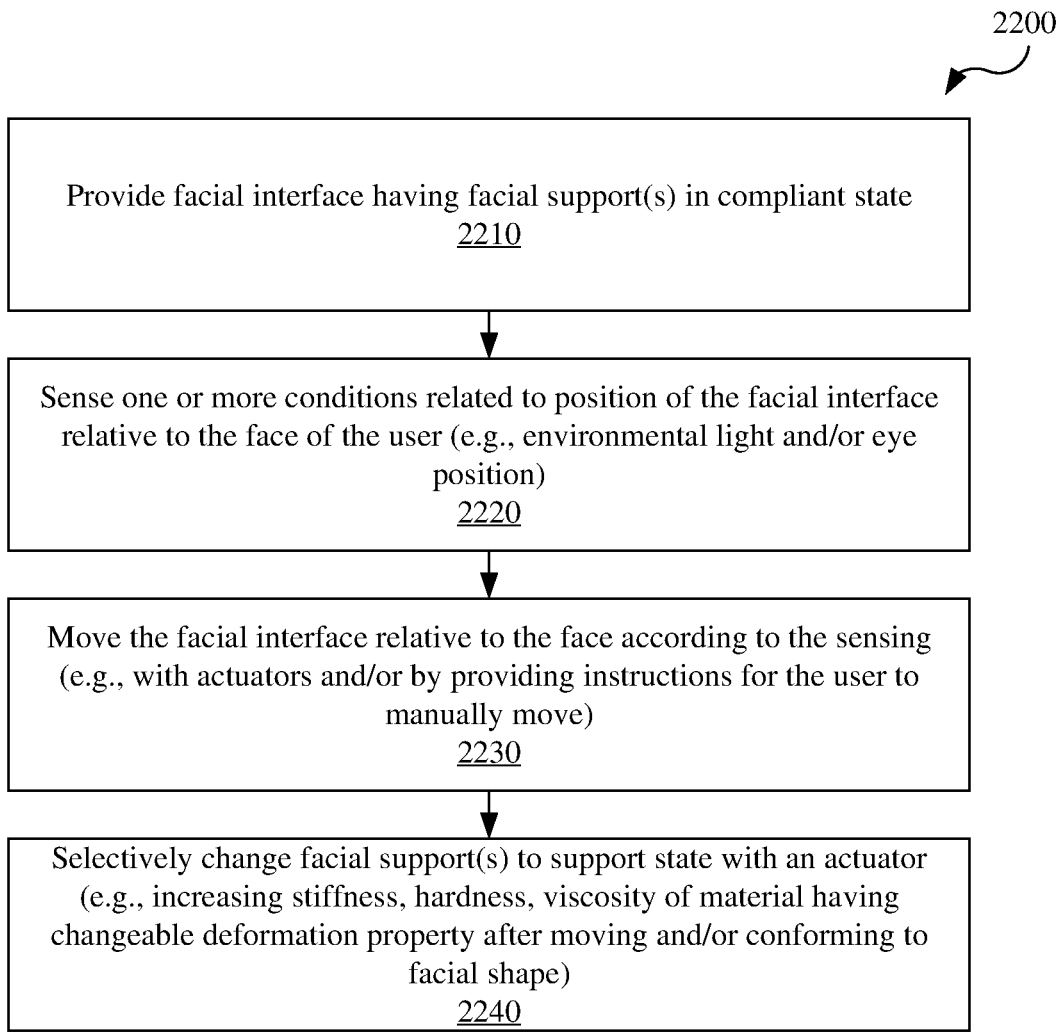
FIG. 22 is a flow diagram of a second process for fitting a facial interface to a user.
Figure 23:
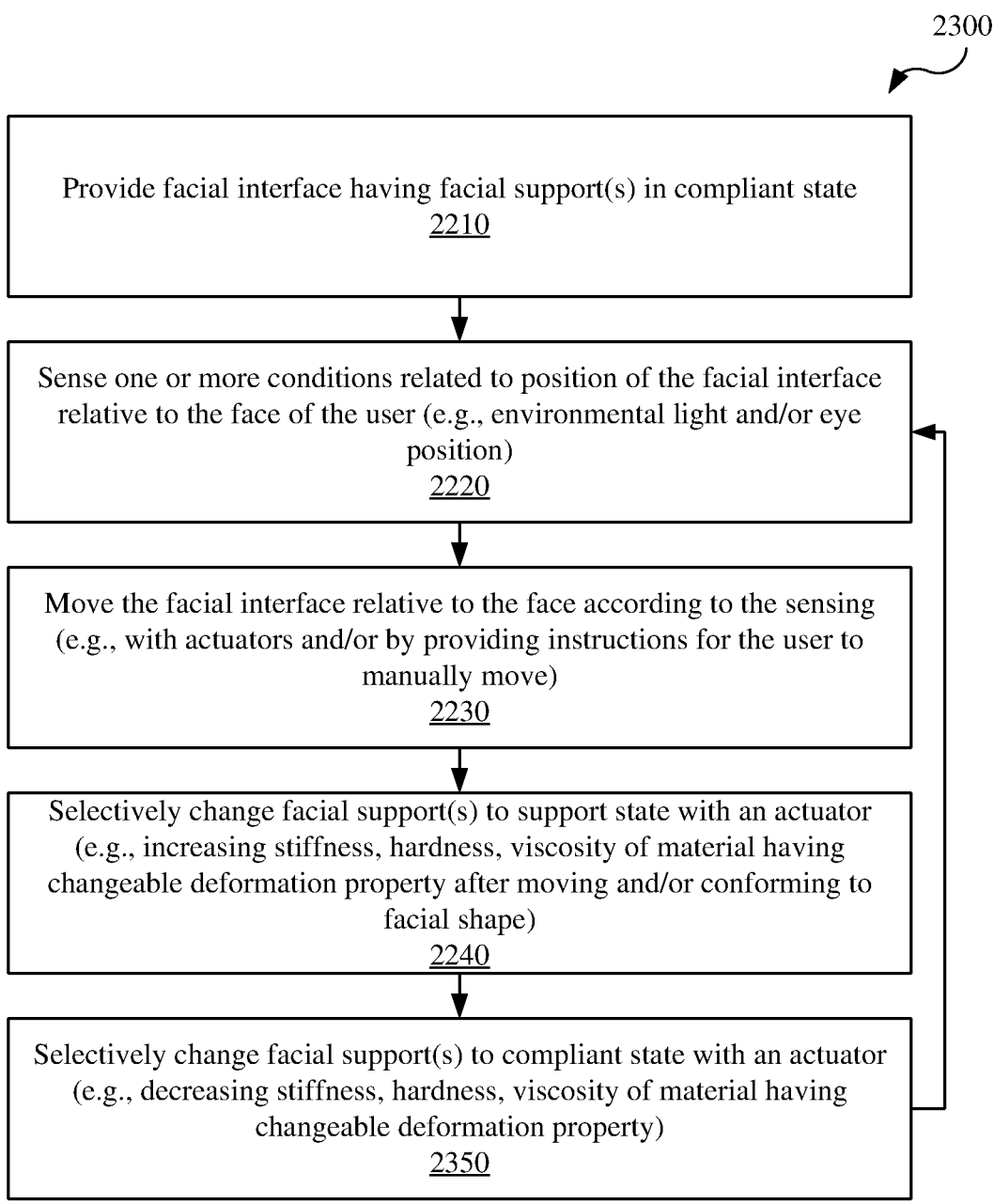
FIG. 23 is a flow diagram of a third process for fitting a facial interface to a user.
Figure 24:
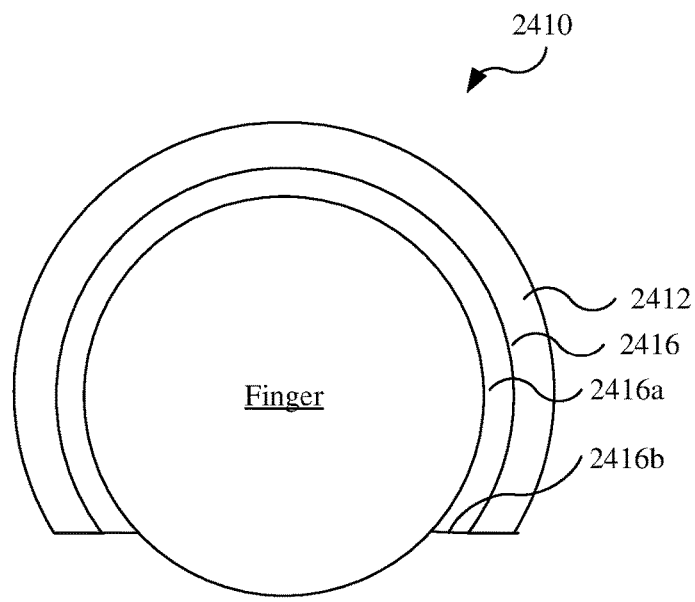
FIG. 24 is an end view of a finger-worn user input device on a finger of a user.

Referring to FIGS. 21 to 23, processes are described for fitting a facial interface (e.g., facial supports) of head-mounted displays to users. As shown in FIG. 21, a process 2100 is provided for custom-fitting a facial support of a head-mounted display unit, such as the facial interface 116 of the head-mounted display unit 110, to a user. The process 2100 generally includes providing 2110 a facial interface having one or more facial supports with selective deformation property (e.g., of a structural material thereof), and changing 2120 the state of the facial supports from a compliant state to a support state (e.g., by changing a deformation property after conforming the facial support to a shape of the face of a user, such as to one or more facial datums).

The providing 2110 includes providing the facial interface, such as the facial interface 116, with one or more facial supports, such as the facial supports 660. The one or more facial supports 660 are provided on the facial interface 116, so as to engage one or more facial datums 510 of the face of the user. For example, one facial support 660 may be provided for each of the five facial datums 510 discussed previously (e.g., five of the facial supports 660 that correspond to the brows 512, nose bridge 514, and cheeks 516), one of the facial supports 660 may be provided for multiple of the facial datums 510 (e.g., one upper or brow facial support 662 for the brows 512 and one lower or cheek facial support 666 for the cheeks 516 and/or nose bridge 514).

Each of the facial supports 660 may be configured as described above, for example, being provided in a compliant state and being changeable from the compliant state to the support state by including one of the support materials 1162 having selective deformation properties (e.g., being a photopolymer, thermosetting polymer, shape memory polymer, magnetorheological fluid, and/or a phase change material).

The changing 2120 of the facial supports to the support state includes, for example, changing a support material 1162 of the facial support 660 by increasing one or more of stiffness, hardness, and/or viscosity of the support material 1162. Depending on the type of support material, the changing 2120 of the deformation property may be performed by one of the types of material actuators 1164 discussed above (e.g., providing light, heat, a magnetic field, or a nucleation site), as operated by the controller 320. The changing 2120 occurs after the shape of the facial support 660 (e.g., a forward surface thereof) conforms to the shape of the face F of the user (e.g., to the facial datums 510), such as with the facial interface 116 being coupled to the head-mounted display unit 110 and worn on the head H of the user. The changing 2120 of the deformation property may be initiated by the user. Instead or additionally, the display system 100 may provide active feedback for the user to properly position the head-mounted display unit 110 (e.g., visually and/or audibly for the displays 114 and/or the sensors 330 to be in proper position relative to the eyes of the user). Once properly positioned, the controller 320 then operates the material actuator 1164 to change the deformation property of the support material 1162. Operation of the facial supports 660 is controlled by a processor or controller, such as the processor 422 and/or the controller 320, such as upon initiation by the user.

Referring to FIG. 22, another process 2200 is provided for custom-fitting a facial interface. The process generally includes providing 2210 a facial interface having one or more facial supports in a compliant state, sensing 2220, moving 2230 the facial interface in response to the sensing 2220, and changing 2240 the facial supports to the support state in response to the sensing 2220 upon completion of the moving 2230.

The providing 2210 includes providing a facial interface (e.g., the facial interface 116), which may be coupled to a head-mounted display unit (e.g., the head-mounted display unit 110), as described above for the providing 2110.

The sensing 2220 includes sensing with one or more sensors (e.g., the sensors 330 of the head-mounted display unit 110) one or more conditions according to which the facial interface 116 is positioned relative to the user. One or more of the sensors 330 detects one or more of environmental light, eye position, and/or position of the head-mounted display unit. In one example, environmental light in the eye cavity, which is surrounded by the facial interface 116, is detected with a camera. In another example, the positions of the user's eyes are detected, such as with an eye camera. In a still further example, the position and/or orientation of the head-mounted display unit 110 is detected, such as with an accelerometer, gyroscope, and/or inertial measurement unit (IMU).

The moving 2230 includes moving the facial interface 116 and/or the head-mounted display unit 110 relative to the face of the user. The moving 2230 is performed according to the sensing, so as to properly position the facial interface 116 and/or the head-mounted display unit 110 relative to the user to block environmental light (e.g., such that the facial seal 670 engages the face F of the user) and/or properly locate and/or orient the displays 114 relative to eyes of the user.

The moving 2230 may be performed by operating the displacement actuators 2090 to control the localized displacement (e.g., at the facial datums 510) of the head-mounted display unit 110 relative to the face F of the user (e.g., by moving the head-mounted display unit 110 away from the face F or closer thereto in conjunction with tension of the head support 118). For example, if the facial seals 670 are not engaged with the face (e.g., being detected by ambient light), one or more of the displacement actuators 2090 move the facial interface 116 and the facial seals 670 closer to the face F for engagement therewith. If the displays 114 are not properly positioned (e.g., distance and/or angle relative to the eyes of the user), the one or more displacement actuators 2090 move the facial interface 116 and, thereby, the displays 114 into proper position relative to the eyes of the user (e.g., translation toward and/or away from the face F). It should be noted that such movement by the displacement actuators 2090 may be uneven, so as to pivot the head-mounted display unit 110 relative to the face F of the user (e.g., to tilt upward or downward, leftward or rightward).

Instead or additionally, the moving 2230 may include providing instructions to the user (e.g., graphically and/or audibly) to move the head-mounted display unit 110. For example, such instructions may include directing the user to move the head-mounted display unit 110 leftward, rightward, upward, downward, and/or rotationally relative to the face to align the displays 114 with the eyes of the user. Inward and/outward movement may be subsequently performed automatically by the displacement actuators 2090 or by the user (e.g., by providing instructions to the user for inward and/or outward movement at one or more locations, such as the facial datums 510).

Operation of the facial supports 660 and/or the displacement actuators 2090 and/or providing instructions to the user is controlled by a processor or controller, such as the processor 422 and/or the controller 320, according to the sensors 330.

The changing 2240 of the facial supports to the support state includes, for example, changing a deformation property of the support material 1162 of the facial support 660 by increasing one or more of stiffness, hardness, and/or viscosity of the support material 1162, as was described with the changing 2120. Furthermore, in some embodiments of the facial support 660, the support material 1162 surrounds the displacement actuator 2090, such that changing the deformation property hinders or prevents movement of the displacement actuators 2090.

Referring to FIG. 23, a process 2300 is provided for dynamically fitting a facial interface to a user. The process 2300 generally includes the process 2200 described previously. The process 2300 additionally includes selectively changing 2350 the facial support to a compliant state, then repeating operations the sensing 2220, moving, 2230, and changing 2240 described previously. For example, the sensing 2220 may be continuously or periodically performed to determine whether environmental light is adequately blocked and/or the eyes remain in proper position (e.g., in case the head-mounted display unit 110 has shifted on the face F of the user). In response to excessive light or eyes being out of position, the facial supports 660 are changed to the compliant state to re-conform to the facial datums 510 as the facial interface is moved to re-achieve suitable light blocking and/or eye position.

Figure 25:
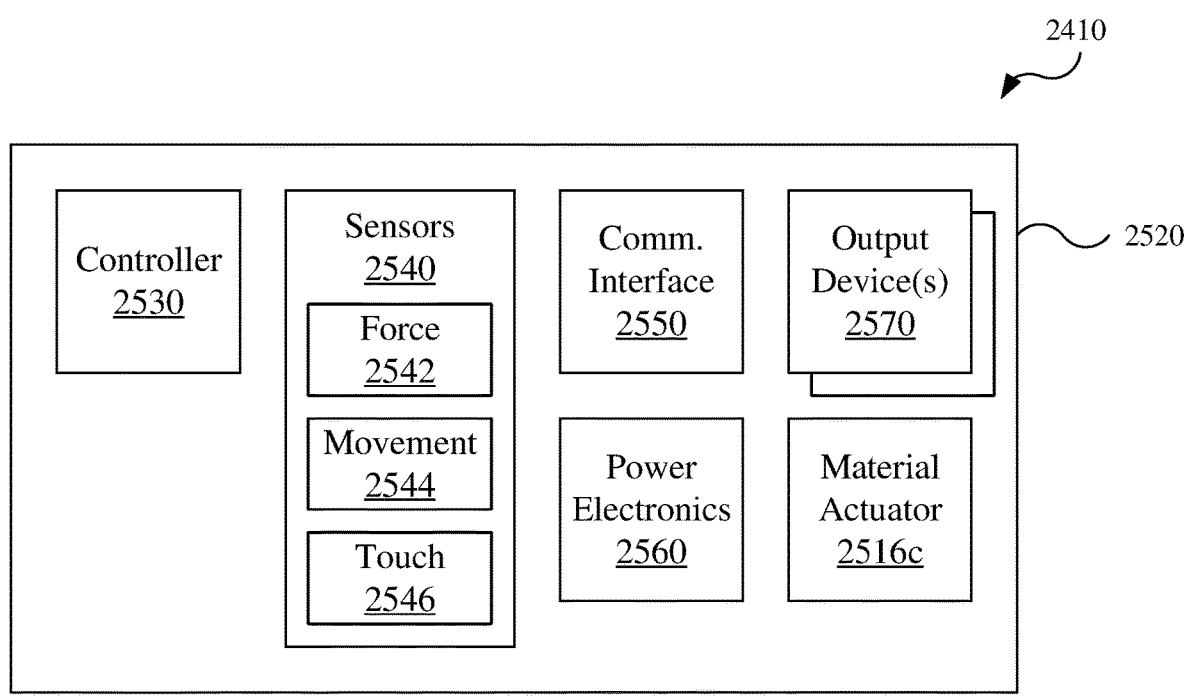
FIG. 25 is a schematic view of the finger-worn user input device.

Referring to FIGS. 25 and 25, a finger-worn user input device 2410 is an electronic device worn on the finger of the user for controlling another electronic device (e.g., a display system, such as the head-mounted display unit 110). The finger-worn user input device 2410 (e.g., user controller) generally includes a chassis 2412, a finger interface 2416, and various electronics 2520. The chassis 2412, for example, provides a primary structure of the finger-worn user input device 2410 and, may as shown, be U-shaped and extend over top of the finger, such that a bottom of the user's fingertip is exposed. The finger interface 2416 is coupled to the chassis 2412 and engages the finger, so as to support the finger-worn user input device 2410 thereon.

The various electronics 2520 are coupled to the chassis 2412. With reference to FIG. 25, the electronics include a controller 2530, sensors 2540, a communications interface 2550, power electronics 2560, and output devices 2570. The controller 2530 may be configured similar to the controller 320. The sensors 2540 may, for example, include one or more of a force sensor 2542, a motion sensor 2544, and/or a touch sensor 2546. The sensors 2540 are discussed in further detail below. The communications interface 2550 sends signals from and receives signals to the finger-worn user input device 2410, for example, when controlling the head-mounted display unit 110. The power electronics 2560 include, for example, a battery to power the other electronics 340. The output devices 2570 may, for example, include a haptic engine (e.g., a mechanism to provide tactile feedback to the user, such as vibrations), visible lights (e.g., indicator lights), and/or infrared lights (e.g., for tracking of the finger-worn user input device 2410 with the sensors 330 of the head-mounted display unit 110).

The force sensor 2542 may, for example, be a strain gauge, pressure sensor, or other type force sensor (e.g., arranged between the finger interface 2416 and the chassis 2412). As the user presses their finger on a surface, the finger expands outward to increase force applied to the force sensor 2542, which is measured thereby. Accordingly, the force sensor 2542, by measuring force applied thereto, is capable of detecting the user touching another object. Alternatively, the force sensor 2542 may be a motion sensor that detects relative movement between opposing sides of the chassis 2412 (e.g., deflection of the chassis 2412 itself or of a spring-hinge (not shown) arranged between two sides thereof). The motion sensor 2544 may, for example, include an accelerometer, a gyroscope, and/or an inertial measurement unit. The motion sensor 2544, for example, allows the position and/or orientation of the finger-worn user input device 2410 to be determined. Moreover, motion information may be correlated with force information to detect various actions, such as tapping of a finger that causes both force to be applied to the force sensor 2542 (i.e., as the finger expands laterally) and deceleration of the finger (i.e., stopping movement as the finger touches an object). The touch sensor 2546 may, for example, include a capacitive trackpad that detects movement therealong of a capacitive object, such as the thumb of the user.

The finger interface 2416 is configured similar to the facial supports 660 described previously by changing from a conforming state to a support state. For example, the finger interface 2416 generally includes a structural material 2416a within a bladder 2416b and a material actuator 2516c (shown schematically in FIG. 25). The structural material 2416a and the material actuator are configured are configured as a suitable combination of materials and actuators as described above with respect to the facial supports 660 to change the deformation property thereof (e.g., increasing stiffness, hardness, and/or viscosity). For example, the structural material 2416a and the material actuator may be a photopolymer and light actuator, a thermosetting polymer or shape memory polymer and a heater, a magnetorheological fluid and electromagnet, or a phase change material and nucleation center, as described previously.

The finger interface 2416 conforms to the shape of the finger of the user in the manner described above for the processes 2100, 2200, and 2300. The finger-worn user input device 2410 is placed on the finger with the finger interface 2416 in the compliant state. Subsequently, after the finger interface 2416 conforms to the shape of the finger, the finger interface 2416 is selectively changed to the support state (e.g., by changing the deformation property of the structural material 2416a by increasing the stiffness, hardness, and/or viscosity thereof). Thereby, the finger-worn user input device 2410 may be more comfortable to the user (e.g., by better distributing force thereof) and/or may provide more reliable functionality. For example, the finger-worn user input device 2410 may thereby be more secure to the finger, so as to minimize relative movement therebetween (e.g., such that movement of the finger-worn user input device 2410 more closely tracks movement of the finger itself). Instead, or additionally, the finger interface 2416 may consistently engage the finger, such that force measurements are more reliable.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for fitting a facial interface to a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize facial interfaces to users. Accordingly, use of such personal information data enables users to have a more comfortable and/or functional experience with a head-mounted display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, custom fitting facial interfaces, the present technology can be configured to allow users to select to "opt in" or "opt out" of participation in the collection of personal information data during registration for services or anytime thereafter. In another example, users can select not to provide custom fitting of facial interfaces. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fitting of facial interfaces may be based on non-personal information data or a bare minimum amount of personal information, such as the with only passive fitting being performed by the device associated with a user, other non-personal information available to the, or publicly available information.

What is claimed is:

1. A head-mounted display unit comprising:
   a display; and
   a conformable support coupled to the display for engaging a head of a user to support the display thereon, the conformable support having a material property,
   wherein a material actuator is selectively operable to change the material property to change the conformable support from a compliant state to a support state in which the conformable support is more resistant to shape deformation than in the compliant state,
   wherein in the compliant state, the conformable support is conformable by the face of the user into a conformed shape and in the support state, the facial support is maintained in the conformed shape,
   wherein the material property has a first value in the compliant state and a second value in the support state, and the first value is different from the second value.

2. The head-mounted display unit according to claim 1, comprising two or more of the conformable supports and a facial seal, wherein each of the conformable supports is a facial support configured to conform to and engage a different facial datum for supporting the display thereon, and the facial seal is configured to engage a face of the head of the user with less pressure than the facial supports and blocks environmental light from eyes of the user.

3. The head-mounted display unit according to claim 1, wherein the conformable support includes a support material and a material actuator, wherein the material actuator is selectively operable to change a material property of the support material to change the conformable support to the support state.

4. The head-mounted display unit according to claim 3, wherein the support material is one of a photopolymer, a thermosetting polymer, a shape memory polymer, a magnetorheological fluid, a phase change material, or a multi-part hardening material.

5. The head-mounted display unit according to claim 4, wherein the support material is one of the photopolymer, the thermosetting polymer, or the shape memory polymer, and the material actuator is one of a light source that outputs light or a heat source that outputs heat to harden the support material.

6. The head-mounted display unit according to claim 4, wherein the support material is the multi-part hardening material having at least two components, and the material actuator is operated to selectively mix the two components to harden the multi-part hardening material.

7. The head-mounted display unit according to claim 4, wherein the support material is the magnetorheological fluid, and the material actuator is an electromagnet that outputs a magnetic field to change viscosity of the magnetorheological fluid.

8. The head-mounted display unit according to claim 3, wherein the display and the material actuator receive electrical power from a common power source.

9. The head-mounted display unit according to claim 3, wherein the material property is irreversibly changeable by the material actuator.

10. The head-mounted display unit according to claim 1, wherein in the compliant state, the conformable support is conformable by the head of the user into a conformed shape, and in the support state, the conformable support is substantially maintained in the conformed shape.

11. The head-mounted display unit according to claim 10, wherein in the compliant state, the conformable support is conformable for moving the display into a predetermined eye position relative to an eye of the user, and in the support state, the conformable support is maintained in the conformed shape to support the display in the predetermined eye position.

12. The head-mounted display unit according to claim 11, wherein the predetermined eye position has a volume of a cubic centimeter or less measured relative to the display.

13. The head-mounted display unit according to claim 1, comprising two or more of the conformable supports, wherein each of the conformable supports is a facial support configured to conform to a different facial datum of the user for supporting the display thereon.

14. The head-mounted display unit according to claim 13, wherein one of the facial supports is configured to engage a brow of the user and another of the facial supports is configured to engage a cheek of the user.

15. The head-mounted display unit according to claim 13, further comprising a facial seal having segments that engage portions of a face of the head of the user between the facial supports, wherein the segments of the facial seal and the facial supports cooperatively surround eyes of the user to block environmental light.

16. The head-mounted display unit according to claim 1, further comprising a head support coupled to the display for supporting the display on the head of the user, wherein the conformable support is a local head support that engages the head of the user in one or more of a temple region, an ear region, a crown region, or a rear region of the head of the user.

17. A facial interface comprising;
    a chassis having a front side and a back side, the back side being configured to couple to a head-mounted display unit; and
    a facial support coupled to the front side of the chassis for engaging a face of a user to support the head-mounted display unit thereon, wherein the facial support includes a support material having a deformation property that is selectively changeable by a material actuator from a compliant state to a support state;

wherein the deformation property includes a stiffness of the support material, a hardness of the support material, a viscosity of the support material, or a combination thereof, and the material actuator causes a value of the deformation property to increase to maintain the support material in the support state.

18. The facial interface according to claim 17, wherein in the compliant state, the support material is conformable to the face of the user, and in the support state, the support material is more resistant to shape deformation than in the compliant state.

19. The facial interface according to claim 17, wherein the facial support includes the material actuator, and the material actuator receives electrical power from the head-mounted display unit when the facial interface is coupled thereto.

20. The facial interface according to claim 19, wherein the material actuator is a heat source, and the support material includes one of a thermosetting polymer or a shape memory polymer.

21. The facial interface according to claim 19, wherein the material actuator is a light source, and the support material includes a photopolymer.

22. The facial interface according to claim 17, further comprising a light seal configured to engage the face of the user with less pressure than the facial support to block environmental light from reaching eyes of the user.

23. The facial interface according to claim 22, comprising a plurality of the facial supports that are spaced apart, and the light seal is engageable with the face of the user between the plurality of the facial supports.

24. A head-mounted display unit comprising:
a display;
a facial seal; and
a conformable support coupled to the display for engaging a head of a user to support the display thereon, the conformable support being selectively changeable from a compliant state to a support state in which the conformable support is more resistant to shape deformation than in the compliant state,
wherein the conformable support is a facial support configured to conform to and engage a facial datum for supporting the display thereon, and the facial seal is configured to engage a face of the head of the user with less pressure than the facial support and blocks environmental light from eyes of the user,
wherein the facial support includes a support material and a material actuator that is selectively operable to change a material property of the support material to change the facial support to the support state, and
wherein in the compliant state, the facial support is conformable by the face of the user into a conformed shape, and in the support state, the facial support is maintained in the conformed shape.

* * * * *